United States Patent [19]

Brearly

[11] Patent Number: 4,458,473
[45] Date of Patent: Jul. 10, 1984

[54] TOBACCO HARVESTER

[76] Inventor: Harry A. L. Brearly, R.R. 3, Langton, Ontario, Canada, N0E 1G0

[21] Appl. No.: 363,504

[22] Filed: Mar. 30, 1982

[51] Int. Cl.³ .............................................. A01D 45/16
[52] U.S. Cl. .................................... 56/27.5; 239/679; 414/301
[58] Field of Search .................. 56/27.5; 414/301, 26; 239/679, 681, 687, 689; 198/642, 533

[56] References Cited

U.S. PATENT DOCUMENTS 3,565,268  2/1971  Buschbom ............................ 414/301
4,037,391  7/1977  Mitchell et al. ...................... 56/27.5

FOREIGN PATENT DOCUMENTS 200539  12/1955  Australia ............................ 239/687
1090588 12/1980  Canada .............................. 56/27.5

Primary Examiner—Jay N. Eskovitz
Attorney, Agent, or Firm—Lyon & Lyon

[57] ABSTRACT

A tobacco harvester includes a distributor placed between the discharge of the conveyor and the pallet. The distributor comprises of a horizontal corrigated disc rotatable about a vertical axis. The disc is rotated by a hydraulic motor and is positioned so that leaves leaving the conveyor on the disc distribute evenly in the pallet.

13 Claims, 3 Drawing Figures

TOBACCO HARVESTER

The present invention relates to harvesting machines and in particular to such machines as are used to harvest leaf products, such as tobacco.

It is well known to harvest produce by means of mechanical harvesting equipment. Such equipment usually operates to remove the crop from the ground, separate the crop from the trash and deposit the harvested crop into suitable containers for storage. The harvesting of a crop such as tobacco requires the separation of the leaves from the remainder of the plant and the storage of the leaves in a suitable container carried by the harvester for subsequent placement into a curing shed. Most machines used for tobacco harvesting incorporate a defoliator which strips the leaves from the stalk and a conveyor for moving the leaves from the area of the defoliator to an elevated location from where they are dropped into a bin carried on the machine. The bin is supported below the outlet of the conveyor and can be removed from the machine when the bin is full and replaced with an empty bin.

Such machines are a great saving over manual harvesting techniques but their full capability has not been realized because of the limited capacity of the storage bins. It has been found that when the leaf product is deposited into the bin it tends to accumulate in a heap immediately below the outlet of the conveyor and therefore requires frequent changing of the bin which slows the progress of the harvesting operation.

It is therefore an object of the present invention to obviate or mitigate the above disadvantages.

According to the present invention there is provided a tobacco leaf distributor for use in combination with a tobacco harvester having a conveyor for conveying harvested leaves from a defoliator to a receptacle, said tobacco leaf distributor comprising a bracket for attachment to said harvester, a disc rotably supported on said bracket for rotation about a generally vertical axis and motor means to rotate said disc, said disc having a smooth upwardly directed surface for impingement by said leaves said bracket supporting said disc intermediate said conveyor and said receptacle whereby leaves are deposited from said conveyor onto said upwardly directed surface of said disc and are distributed by rotation thereof into said receptacle.

By providing a distributor of the type described above, the leaf product is uniformly distributed about the container which increases the effective capacity of the container and reduces the number of interruptions to the harvesting operation.

An embodiment to the invention will now be described by way of example only with reference to the accompanying drawings in which.

Figure 1:
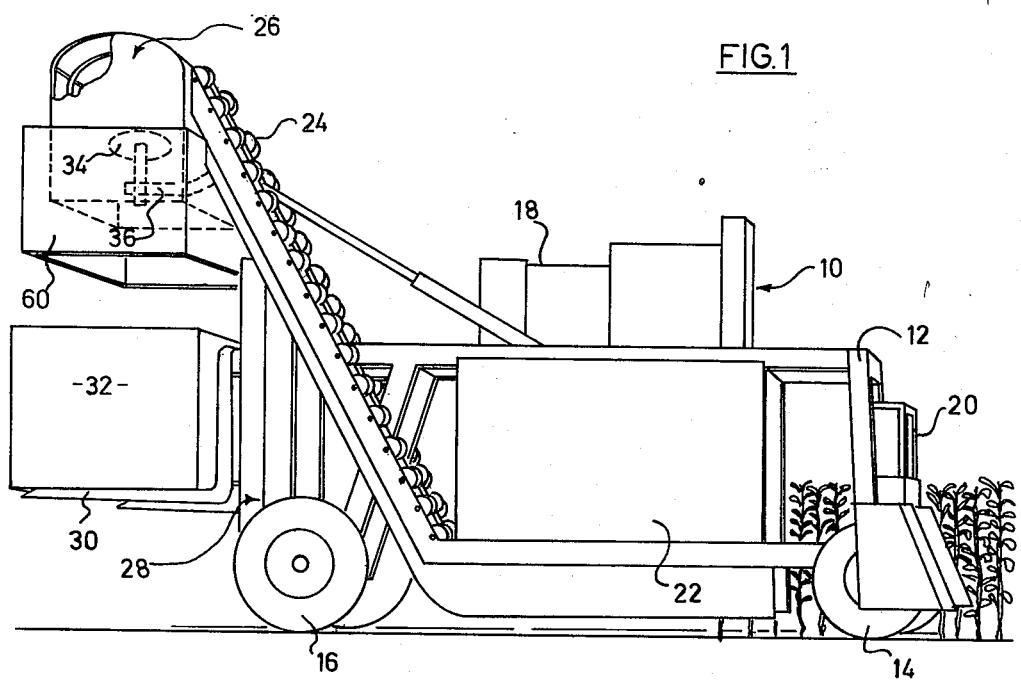
FIG. 1 is a general perspective view of a tobacco harvester.
Figure 2:
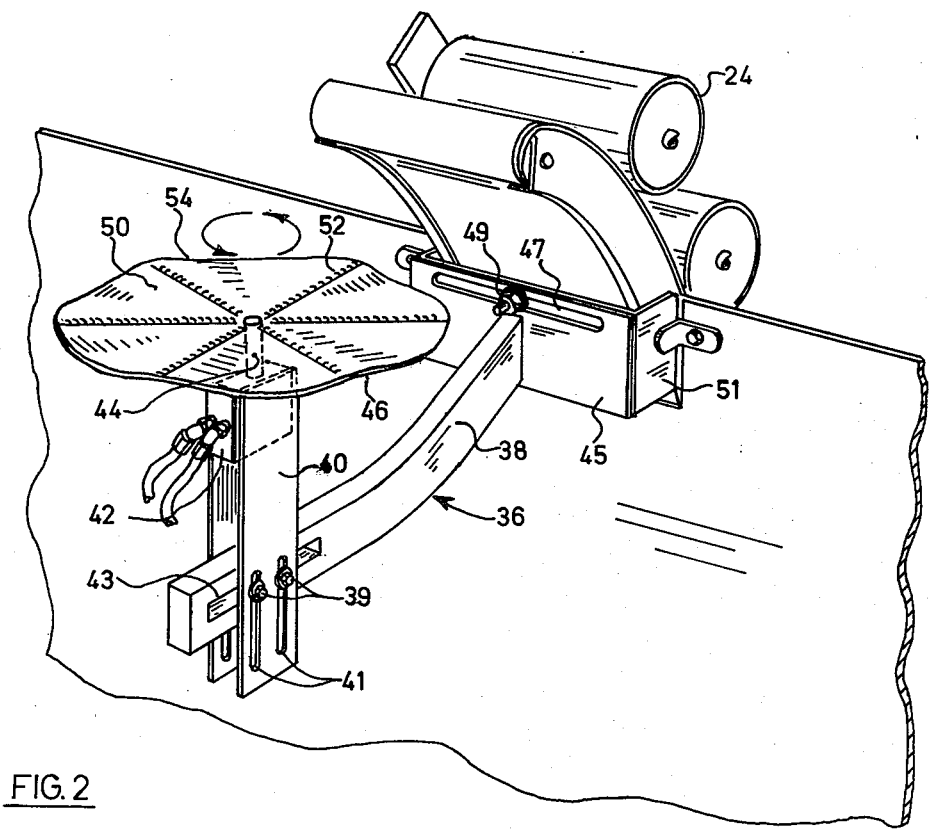
FIG. 2 is an enlarged side elevation of the rear portion of the harvester shown in FIG. 1.

Referring now to FIG. 1, a tobacco harvester 10 comprises a vehicle chassis 12 supported upon steerable wheels 14 and propelled by rear driving wheels 16. An engine 18 provides the power to the harvesting mechanism and to the drive wheels 16 and the vehicle is controlled from an operator station 20.

The harvesting mechanism comprises a defoliator 22 located on the lower portion of the chassis between the steerable wheels 14 to remove the leaf of the tobacco plant from the stalk. The leaves are carried to an elevated position by a conveyor 24 which discharges the leaf into a hood assembly 26.

A fork lift assembly 28 is supported on the chassis 12 adjacent the rear drive wheel 16. The fork lift assembly 28 includes a pair of forks 30 which may be raised and lowered by conventional hydraulic motor means.

A pallet 32 provides a receptacle for the harvested leaves and is supported on the forks 30. The empty pallet 32 is elevated by the forks 30 to a location just below the hood assembly 26 and is held there until full. The forks 30 are then lowered, the pallet deposited on the ground and an empty pallet moved into its place on the forks 30.

Figure 3:
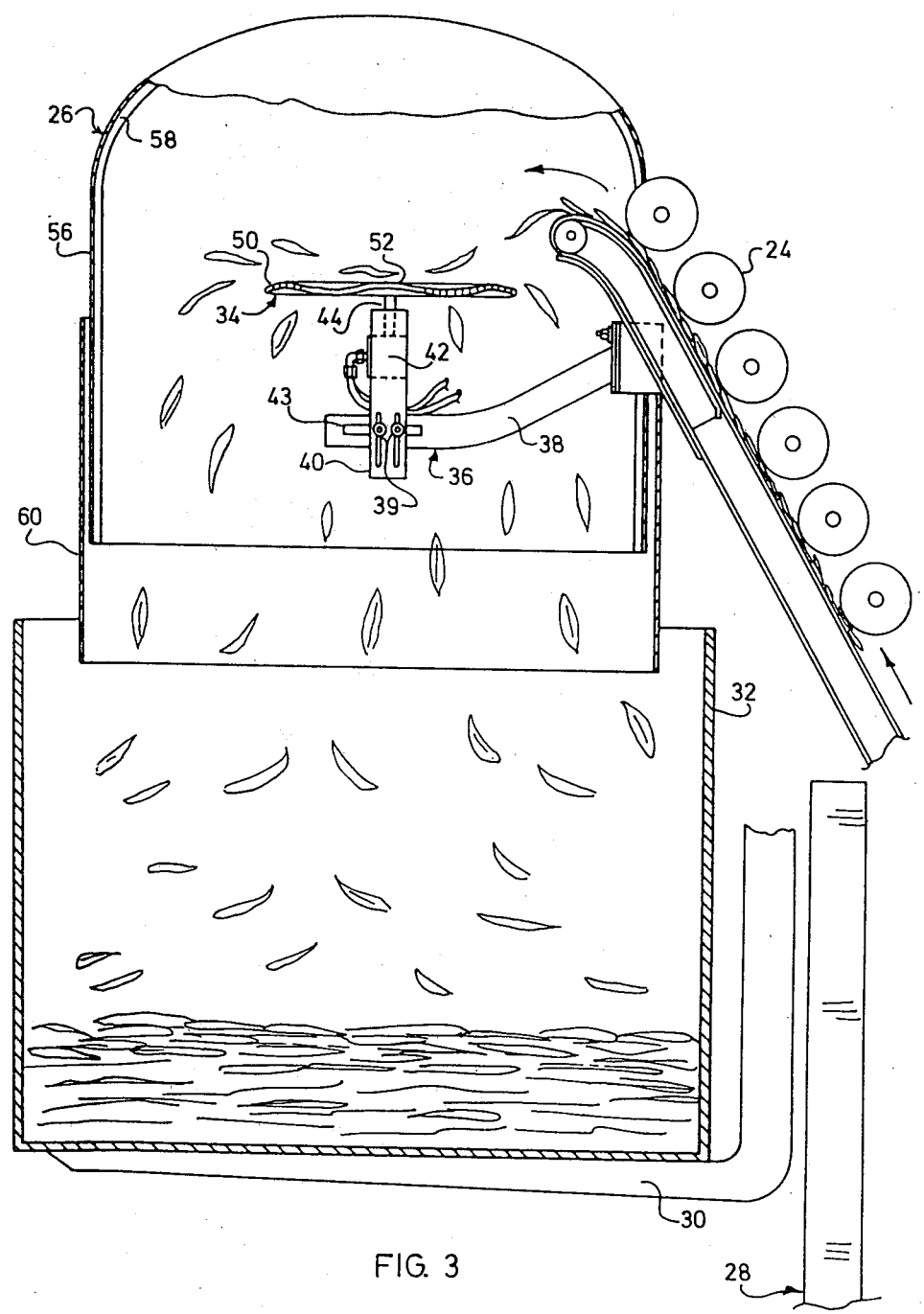
FIG. 3 is a rear view of a portion of the harvester shown in FIG. 2 with portions of the harvester removed for clarity.

Located beneath the hood assembly 26 is a disc 34 which is rotatably mounted on a bracket assembly 36. As may best be seen in FIG. 3 the bracket assembly 36 includes a downwardly sloping arm 38 and a bifurcated standard 40 which is secured to the arm 38 and extends in a generally vertical direction.

The standard 40 is secured to the arm 38 by a pair of bolts 39. The standard 40 is provided with a pair of parallel slots 41 and the arm 38 is provided with a single slot 43. The bolts 39 are received in the slots 41 and pass through the single slot 43 so that the height and position of the standard 40 may be adjusted relative to the arm 38.

A plate 45 is welded to the opposite end of the arm 38 to the slot 43 and generally perpendicular thereto. A slot 47 is formed in one edge of the plate 45 to receive a bolt 49. The bolt 49 is secured to the face of a channel member 51 that straddles the conveyor 24 and is welded to the frame of the conveyor.

The arm 38 is thus secured to the harvester 10 by the bolt 49 with the slot 47 allowing lateral adjustment at the arm 38.

A hydraulic motor 42 is located between the bifurcated arms of the standard 40 and has a rotatable output shaft 44 which rotates about a generally vertical axis. The shaft 44 is connected to the underside 46 of disc 34 to rotate the disc 34 in a generally horizontal plane.

The inclination of the arm 38 to the horizontal is chosen so that any leaf falling upon the arm will slide down off the arm.

The disc 34 is located so that the leaf discharged from the conveyor 24 impinges upon an upper surface 50 of the disc 34. The upper surface 50 is formed with a number of radially extending corrugations as shown at 52 so that the upper surface 50 presents a non planar surface to the leaf products. The periphery of the disc 54 is also smoothly rounded to avoid the disc cutting the leaf product.

The corrugations may be formed by running radial beads of weld from the centre of the disc so that the heat causes distortion on the disc. Typically 6 heads are used although this number may be varied as desired.

The hood assembly 26 includes a flexible sheet 56 supported on hoops 58. A metal skirt 60 extends from the periphery of the hood 56 encompasses the disc 34 and constrain any product thrown radially from the disc to fall into the pallet 32. The skirt 60 is made adjustable to accomodate different dimensions of pallet.

In operation, the leaf is separated from the trash by the defoliator 22 and carried by the conveyor 24 to the region of the hood assembly 26. The leaf is discharged from the conveyor and falls onto the upper surface 50 of the disc 34. The disc is rotated continuously by the motor 42 and distributes the leaves radially so that they fall into the pallet 32. The action of the disc 34 ensures a uniform distribution which maximizes the practical capacity of the pallet 32. The hood 26 ensures that none of the leaves are distributed beyond the pallet 32 so that all the leaves fall into the pallet.

It will be seen therefore that the utilization of the distributor constituted by the rotating disc ensures efficient operation of the harvester by increasing the amount of leaf held within the pallet and thereby decreasing the frequency of stops to unload the pallet.

In the illustrated embodiment, a single row harvester has been shown. The distributor may also be used in a multiple row harvester with a disc positioned below each conveyor. With such an arrangement the hood and skirt pass around all the distributors even though more of than them are pallet, may be used to collect the crop.

The provision of slots 41, 43, 47 permit the location of the disc to be adjusted for optimum performance, which typically will be symetrical with the centre line of the conveyor. The rotational speed of the disc may also be adjusted as required but it has been found that a rotational speed of 100 r.p.m. for a disc having a diameter of 24 inches provides good results.

I claim:

1. A tobacco leaf distributor for use in combination with a tobacco harvester having a conveyor for conveying harvested leaves from a defoliator to a receptacle, said tobacco leaf distributor comprising a bracket for attachment to said harvester, a disc rotatably supported on said bracket for rotation about a generally vertical axis and motor means to rotate said disc, said disc having a smooth upwardly directed surface for impingement by said leaves said bracket supporting said disc intermediate said conveyor and said receptacle whereby leaves are deposited from said conveyor onto said upwardly directed surface of said disc and are distributed by rotation thereof into said receptacle.

2. A distributor according to claim 1 wherein said upwardly directed surface of said disc is formed with a plurality of radially extending corrugations upon which said leaves fall, adjacent corrugations smoothly merging to maintain said smooth surface and minimise leaf damage.

3. A distributor according to claim 1 wherein said bracket slopes downwardly from an attachment point to attach said bracket to said harvester toward an attachment point for said disc.

4. A distributor according to claim 1 wherein a hood encompasses said disc and is arranged to be attached to said harvester adjacent said conveyor.

5. A distributor according to claim 2 wherein said disc is mounted above said bracket.

6. A distributor according to claim 5 wherein said disc is domed and is located below its centre.

7. A tobacco leaf harvester comprising a pick up and defoliator, conveyor means to convey said leaves from said defoliator to a collector and a distributor to distribute leaves in said collector, said distributor comprising a disc supported between said conveyor and said collector and rotatable about a generally vertical axis for rotation in a horizontal plane and motor means to rotate said disc, said disc having a smooth upwardly directed surface whereby leaves discharged from said conveyor impinge upon said surface of said disc and are uniformly distributed about said collector, by rotation of said disc.

8. A leaf harvester according to claim 6 wherein said disc is supported on a bracket connected to said harvester adjacent the discharge of said conveyor.

9. A leaf harvester according to claim 8 wherein said bracket slopes downwardly from its point of attachment to said harvester to a support point for said disc.

10. A leaf harvester according to claim 9 wherein said disc is supported above said support point.

11. A leaf harvester according to claim 10 wherein a hood is connected to said harvester adjacent the discharge of said conveyor and depends therefrom to encompass said distributor.

12. A leaf harvester according to claim 7 wherein said disc includes a corrugated surface having a plurality of radially extending corrugations and said leaves impinge upon said corrugated surface, adjacent corrugations smoothly merging to maintain said smooth surface and minimise leaf damage.

13. A leaf harvester according to claim 12 wherein said disc is domed and its periphery is located below its centre.

* * * * *